United States Patent
Shinozaki et al.

(10) Patent No.: US 12,027,730 B2
(45) Date of Patent: Jul. 2, 2024

(54) FUEL CELL STACK

(71) Applicant: TOYOTA SHATAI KABUSHIKI KAISHA, Kariya (JP)

(72) Inventors: Yoshinori Shinozaki, Kariya (JP); Satoshi Futami, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 395 days.

(21) Appl. No.: 17/627,078

(22) PCT Filed: Mar. 12, 2020

(86) PCT No.: PCT/JP2020/010750
§ 371 (c)(1),
(2) Date: Jan. 13, 2022

(87) PCT Pub. No.: WO2021/014677
PCT Pub. Date: Jan. 28, 2021

(65) Prior Publication Data
US 2022/0255090 A1    Aug. 11, 2022

(30) Foreign Application Priority Data
Jul. 19, 2019    (JP) .................. 2019-133625

(51) Int. Cl.
*H01M 8/0265*    (2016.01)
*H01M 8/2465*    (2016.01)

(52) U.S. Cl.
CPC ....... *H01M 8/0265* (2013.01); *H01M 8/2465* (2013.01)

(58) Field of Classification Search
CPC .... H01M 8/0265; H01M 8/2465; H01M 8/24; H01M 8/026; H01M 8/0276; H01M 8/0258; H01M 8/02; H01M 8/10
See application file for complete search history.

(56) References Cited

U.S. PATENT DOCUMENTS 11,145,881 B2 * 10/2021 Nakayama .......... H01M 8/0258
2012/0028139 A1 * 2/2012 Kawajiri ............. H01M 8/0258
                                                              429/414
(Continued)

FOREIGN PATENT DOCUMENTS

JP    2010-170720 A    8/2010
JP    2011-150801 A    8/2011
(Continued)

OTHER PUBLICATIONS

KR Office Action dated Mar. 14, 2024 as received in Application No. 10-2021-7043373.

*Primary Examiner* — Stewart A Fraser
(74) *Attorney, Agent, or Firm* — Maschoff Brennan

(57) ABSTRACT

A fuel cell stack includes stacked cells, each including a sheet-shaped power generation portion, two separators, a gas passage defining plate that includes a gas passage portion through which reactant gas flows, and a frame member that includes a supply port and a discharge port. The gas passage portion includes opposing portions extended in a flow direction of the reactant gas and arranged in parallel in an orthogonal direction and wavy portions each having a wavy cross-sectional shape orthogonal to the orthogonal direction. The gas passage portion includes a first passage portion adjacent to the supply port in the flow direction and a second passage portion adjacent to the first passage portion in the orthogonal direction. The connection passages of the second passage portion each have a larger cross-sectional flow area than the connection passages of the first passage portion.

10 Claims, 8 Drawing Sheets

(56) References Cited

U.S. PATENT DOCUMENTS

| | | | |
|---|---|---|---|
| 2012/0301810 A1 | 11/2012 | Kawajiri et al. | |
| 2014/0017582 A1* | 1/2014 | Hashimoto | H01M 8/0247 429/457 |
| 2015/0236368 A1* | 8/2015 | Hashimoto | H01M 8/0254 429/479 |
| 2015/0333357 A1* | 11/2015 | Hashimoto | H01M 8/04089 429/458 |
| 2016/0043412 A1 | 2/2016 | Hashimoto et al. | |
| 2019/0103617 A1* | 4/2019 | Nakayama | H01M 8/04156 |

FOREIGN PATENT DOCUMENTS

| | | |
|---|---|---|
| JP | 2013-206876 A | 10/2013 |
| JP | 2015-015218 A | 1/2015 |
| JP | 2016-021339 A | 2/2016 |
| JP | 2017-041404 A | 2/2017 |
| JP | 2017-201617 A | 11/2017 |

* cited by examiner

FUEL CELL STACK

TECHNICAL FIELD

The present disclosure relates to a fuel cell stack.

BACKGROUND ART

Polymer electrolyte fuel cells include a fuel cell stack that includes stacked cells (see, for example, Patent Document 1). Each cell disclosed in Patent Document 1 includes a power generation portion including a membrane electrode assembly, two separators that hold the power generation portion, and a gas passage defining plate disposed between the power generation portion and the two separators.

The gas passage defining plate includes recesses and projections that are alternately arranged. The gas passage defining plate also includes a gas passage portion including a mesh-shaped part defined by the recesses and the projections and by the power generation portion. Reactant gas, such as fuel gas or oxidant gas, flows through the gas passage portion.

Each cell has a rectangular shape in plan view. A fuel gas supply port through which fuel gas is supplied and a fuel gas discharge port through which fuel gas is discharged are respectively disposed at the opposite ends of the power generation portion on the short sides of the cell. Oxidant gas supply ports through which oxidant gas is supplied and oxidant gas discharge ports through which oxidant gas is discharged are respectively disposed at the opposite ends of the power generation portion on the long sides of the cell. The oxidant gas supply ports are spaced apart from each other in the longitudinal direction of the long sides of the cell. Likewise, the oxidant gas discharge ports are spaced apart from each other in the longitudinal direction of the long sides of the cell.

The oxidant gas supplied from the oxidant gas supply ports is supplied to the power generation portion through the gas passage portion of the gas passage defining plate. In the power generation portion, the oxidant gas electrochemically reacts with the fuel gas so as to generate power. The oxidant gas that has not been used to generate power in the power generation portion is discharged out of the oxidant gas discharge ports through the gas passage portion.

PRIOR ART DOCUMENTS

Patent Documents

Patent Document 1: Japanese Laid-Open Patent Publication No. 2016-21339

SUMMARY OF THE INVENTION

Problems that the Invention is to Solve

In the fuel cell stack, in order to improve the power-generating efficiency, it is preferred that reactant gas be diffused over a wider range of the power generation portion (i.e., over a wider range of the gas passage portion).

However, since the oxidant gas supply ports are spaced apart from each other in the longitudinal direction of the long sides of the cell, a partition is disposed between adjacent ones of the oxidant gas supply ports to divide the oxidant gas supply ports from each other. Thus, the oxidant gas flowing from the oxidant gas supply ports through the gas passage portion toward the oxidant gas discharge ports does not easily flow to a portion adjacent to each partition. Accordingly, there is room for improvement to allow reactant gas to be diffused over a wider range of the gas passage portion (i.e., to improve the performance of distributing reactant gas).

It is an objective of present disclosure to provide a fuel cell stack capable of improving the performance of distributing reactant gas.

Means for Solving the Problem

A fuel cell stack that achieves the above-described objective includes stacked cells. Each cell includes a sheet-shaped power generation portion, two separators that hold the power generation portion in a thickness direction, a gas passage defining plate disposed between at least one of the two separators and the power generation portion, the gas passage defining plate including a gas passage portion through which reactant gas flows, and a frame member disposed around the gas passage defining plate, the frame member including a supply port through which the reactant gas is supplied to the gas passage portion and a discharge port through which the reactant gas is discharged from the gas passage portion. A flow direction of the reactant gas flowing from the supply port toward the discharge port is referred to as a flow direction. A direction in which the power generation portion opposes the gas passage portion is referred to as an opposing direction. A direction that is orthogonal to the flow direction and the opposing direction is referred to as an orthogonal direction. The gas passage portion includes opposing portions and wavy portions, the opposing portions being extended in the flow direction and arranged in parallel in the orthogonal direction, the opposing portions opposing the power generation portion. The wavy portions are integrally disposed on opposite sides of each of the opposing portions in the orthogonal direction. The wavy portions each have a wavy cross-sectional shape that is orthogonal to the orthogonal direction. Each of the wavy portions includes first projections and second projections, the first projections protruding closer to the power generation portion than the opposing portions and being in contact with the power generation portion, the second projections protruding closer to a corresponding one of the separators than the opposing portions and being in contact with the separator, and the first projections and the second projections being alternately arranged in the flow direction. A main passage is defined between each of the opposing portions and the power generation portion. The gas passage portion includes connection passages defined by the first projections and the opposing portions, the connection passages each connecting the main passages to each other and being spaced apart from each other in the flow direction. The gas passage portion includes a first passage portion and a second passage portion, the first passage portion being adjacent to the supply port in the flow direction, and the second passage portion being adjacent to the first passage portion in the orthogonal direction. The connection passages of the second passage portion each have a larger cross-sectional flow area than the connection passages of the first passage portion.

In this structure, the connection passages of the second passage portion each have a larger cross-sectional flow area than the connection passages of the first passage portion. Thus, the reactant gas in the connection passages of the second passage portion causes a smaller pressure drop than the reactant gas in the connection passages of the first passage portion. Accordingly, the reactant gas that has flowed from each of the supply ports to the main passages of the first passage portion easily flows to the second passage portion through the connection passages of the second passage portion. That is, the reactant gas that has flowed from each of the supply ports easily flows from the first passage portion toward the second passage portion. This allows the reactant gas to be distributed over a wider range of the gas passage portion. Accordingly, the performance of distributing reactant gas improves.

In the fuel cell stack, it is preferred that the gas passage portion include a third passage portion that is adjacent to the first passage portion on a downstream side in the flow direction and the connection passages of the third passage portion each have a smaller cross- sectional flow area than the connection passages of the first passage portion.

In this structure, the connection passages of the third passage portion each have a smaller cross-sectional flow area than the connection passages of the first passage portion. Thus, the reactant gas in the connection passages of the third passage portion causes a larger pressure drop than the reactant gas in the connection passages of the first passage portion. Accordingly, the reactant gas that has flowed from each of the supply ports to the first passage portion flows to the second passage portion through the connection passages of the second passage portion more easily than to the connection passages of the third passage portion. Accordingly, the performance of distributing reactant gas further improves.

In the fuel cell stack, it is preferred that the wavy portions include a first wavy portion and a second wavy portion that are adjacent to each other in the orthogonal direction. It is preferred that the first wavy portion and the second wavy portion be disposed such that the first projections of the first wavy portion are adjacent to the second projections of the second wavy portion in the orthogonal direction and the second projections of the first wavy portion are adjacent to the first projections of the second wavy portion in the orthogonal direction. It is preferred that the gas passage portion include sub-passages spaced apart from each other in the flow direction, each of the sub-passages being located between adjacent ones of the connection passages in the flow direction, and the sub-passages being respectively defined by the first projections of the first wavy portion, the first projections of the second wavy portion, and the power generation portion so as to connect the connection passages to each other. It is preferred that the gas passage portion include a third passage portion that is adjacent to the first passage portion on a downstream side in the flow direction. It is preferred that the sub-passages of the third passage portion each have a smaller cross-sectional flow area than the sub-passages of the first passage portion.

In this structure, the reactant gas in the sub-passages of the second passage portion causes a smaller pressure drop than the reactant gas in the sub-passages of the first passage portion. Accordingly, the reactant gas that has flowed from each of the supply ports to the first passage portion easily flows to the second passage portion through the sub-passages of the second passage portion. That is, the reactant gas that has flowed from each of the supply ports easily flows from the first passage portion toward the second passage portion. This allows the reactant gas to be distributed over a wider range of the gas passage portion.

In the fuel cell stack, it is preferred that the wavy portions include a first wavy portion and a second wavy portion that are adjacent to each other in the orthogonal direction. It is preferred that the first wavy portion and the second wavy portion be disposed such that the first projections of the first wavy portion are adjacent to the second projections of the second wavy portion in the orthogonal direction and the second projections of the first wavy portion are adjacent to the first projections of the second wavy portion in the orthogonal direction. It is preferred that the gas passage portion include sub-passages spaced apart from each other in the flow direction, each of the sub-passages being located between adjacent ones of the connection passages in the flow direction, and the sub-passages being respectively defined by the first projections of the first wavy portion, the first projections of the second wavy portion, and the power generation portion so as to connect the connection passages to each other. It is preferred that the gas passage portion include a third passage portion that is adjacent to the first passage portion on a downstream side in the flow direction. It is preferred that the sub-passages of the third passage portion each have a smaller cross- sectional flow area than the sub-passages of the first passage portion.

In this structure, the reactant gas in the sub-passages of the third passage portion causes a larger pressure drop than the reactant gas in the sub-passages of the first passage portion. Accordingly, the reactant gas that has flowed from each of the supply ports to the first passage portion flows to the second passage portion through the sub-passages of the second passage portion more easily than through the sub-passages of the third passage portion. That is, the reactant gas that has flowed from each of the supply ports easily flows from the first passage portion toward the second passage portion. This allows the reactant gas to be distributed over a wider range of the gas passage portion.

In the fuel cell stack, it is preferred that the main passages of the second passage portion each have a larger cross-sectional flow area than the main passages of the first passage portion.

In this structure, the main passages of the second passage portion each have a larger cross-sectional flow area than the main passages of the first passage portion. Thus, the reactant gas in the main passages of the second passage portion causes a smaller pressure drop than the reactant gas in the main passages of the first passage portion. Accordingly, the reactant gas that has flowed from each of the supply ports to the main passages of the first passage portion easily flows to the main passages of the second passage portion through the connection passages. That is, the reactant gas that has flowed from each of the supply ports easily flows from the first passage portion toward the second passage portion. Accordingly, the performance of distributing reactant gas further improves.

In the fuel cell stack, it is preferred that the opposing portions of the second passage portion be farther from the power generation portion in the opposing direction than the opposing portions of the first passage portion.

In this structure, the opposing portions defining the main passages of the second passage portion are farther from the power generation portion in the opposing direction than the opposing portions defining the main passages of the first passage portion. Thus, the main passages of the second passage portion each have a larger cross-sectional flow area than the main passages of the first passage portion.

Thus, in this structure, a simple change is made so as to change the distances of the opposing portions from the power generation portion. As a result, the main passages of the second passage portion each have a larger cross-sectional flow area than the main passages of the first passage portion.

In the fuel cell stack, it is preferred that the opposing portions of the second passage portion each have a larger width in the orthogonal direction than the opposing portions of the first passage portion.

In this structure, the width of each of the opposing portions defining the main passages of the second passage portion is larger than the width of the corresponding one of the opposing portions defining the main passages of the first passage portion. Thus, the main passages of the second passage portion each have a larger cross-sectional flow area than the main passages of the first passage portion.

Thus, in this structure, a simple change is made so as to change the width of each opposing portion in the orthogonal direction, As a result, the main passages of the second passage portion each have a larger cross-sectional flow area than the main passages of the first passage portion.

In the fuel cell stack, it is preferred that the gas passage portion include a third passage portion that is adjacent to the first passage portion on a downstream side in the flow direction and that the main passages of the second third passage portion each have a smaller cross-sectional flow area than the main passages of the first passage portion.

In this structure, the main passages of the third passage portion each have a smaller cross-sectional flow area than the main passages of the first passage portion. Thus, the reactant gas in the main passages of the third passage portion causes a larger pressure drop than the reactant gas in the main passages of the first passage portion. As a result, the reactant gas that has flowed from each of the supply ports to the main passages of the first passage portion flows to the second passage portion, which have a relatively small pressure drop, more easily than to the third passage portion, which have a relatively large pressure drop. Accordingly, the performance of distributing reactant gas further improves.

In the fuel cell stack, it is preferred that the opposing portions of the third passage portion be closer to the power generation portion in the opposing direction than the opposing portions of the first passage portion.

In this structure, the opposing portions defining the main passages of the third passage portion are closer to the power generation portion in the opposing direction than the opposing portions defining the main passages of the first passage portion. Thus, the main passages of the third passage portion each have a smaller cross-sectional flow area than the main passages of the first passage portion.

Thus, in this structure, a simple change is made so as to change the distances of the opposing portions from the power generation portion. As a result, the main passages of the third passage portion each have a smaller cross-sectional flow area than the main passages of the first passage portion.

In the fuel cell stack, it is preferred that each of the opposing portions of the first passage portion be made continuous with a corresponding one of the opposing portions of the third passage portion by a step.

This structure causes the reactant gas flowing in the flow direction to collide with the steps. Thus, the pressure drop of reactant gas easily increases at the boundary between the first passage portion and the third passage portion. This increases the difference in pressure drop of reactant gas between the first passage portion and the third passage portion. Effects of the Invention The fuel cell stack according to the present disclosure improves the performance of distributing reactant gas.

MODES FOR CARRYING OUT THE INVENTION

Figure 1:
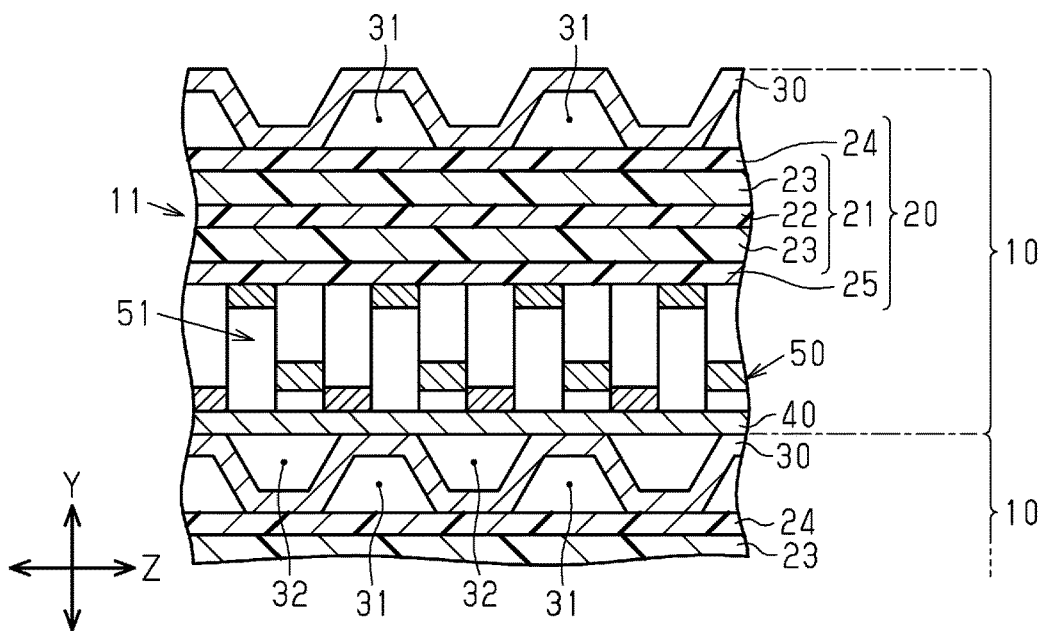
FIG. 1 is a cross-sectional view showing a fuel cell stack according to an embodiment.

An embodiment will now be described with reference to FIGS. 1 to 12.

For illustrative purposes, some parts of the structures in the drawings may be exaggerated or simplified. Further, the dimensional ratios of portions may be different among the drawings.

Referring to FIG. 1, the fuel cell stack according to the present embodiment is a polymer electrolyte fuel cell including stacked cells 10 that each have a substantially rectangular shape in plan view. Each cell 10 includes a membrane electrode gas diffusion layer assembly 20 (hereinafter referred to as MEGA 20), a first separator 30, and a second separator 40. The MEGA 20 includes a sheet-shaped power generation portion 11. The first separator 30 and the second separator 40 hold the MEGA 20 in the thickness direction. A gas passage defining plate 50 is disposed between the MEGA 20 and the second separator 40. The gas passage defining plate 50 includes a gas passage portion 51 through which reactant gas flows.

The first separator 30 is located on the anode side of the power generation portion 11. The second separator 40 is located on the cathode side of the power generation portion 11.

Figure 2:
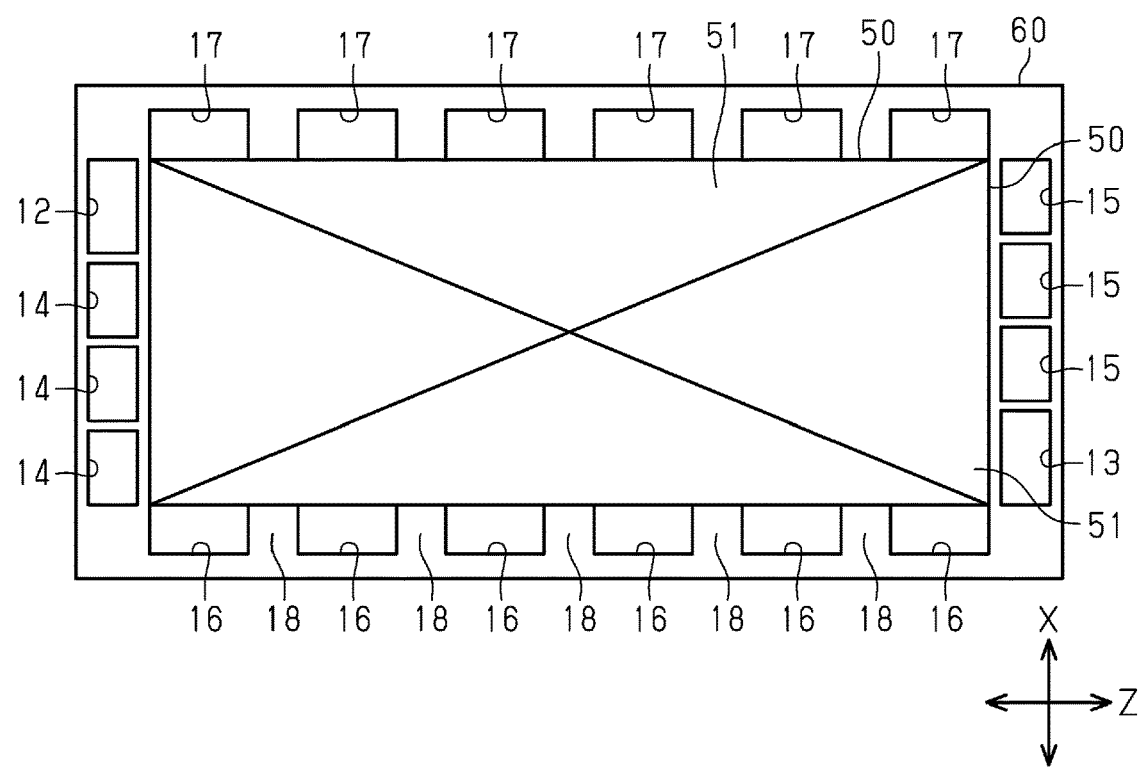
FIG. 2 is a plan view showing the gas passage defining plate and the frame member according to the embodiment.

As shown in FIG. 2, a frame member 60 is disposed around the gas passage defining plate 50. The frame member 60 is made of plastic and has the shape of a substantially rectangular plate in plan view. The MEGA 20 and the gas passage defining plate 50 that are overlapped with each other are fitted to the frame member 60 of the present embodiment. The frame member 60 is held by the first separator 30 and the second separator 40 in the thickness direction.

In the description of FIG. 2, the up-down direction and the left-right direction of FIG. 2 are hereinafter simply referred to as the up-down direction and the left-right direction, respectively. The up-down direction and the left-right direction do not indicate an actual position of the frame member 60.

The frame member 60 includes a fuel gas supply port 12 through which fuel gas is supplied as reactant gas and a fuel gas discharge port 13 through which fuel gas is discharged. The fuel gas supply port 12 and the fuel gas discharge port 13 are respectively located on the opposite sides of the gas passage defining plate 50 in the left-right direction. The fuel gas in the present embodiment is, for example, hydrogen gas. The fuel gas supply port 12 is located on the left of the gas passage defining plate 50 at a position closer to the upper side of the gas passage defining plate 50 than the middle of the gas passage defining plate 50 in the up-down direction. The fuel gas discharge port 13 is located on the right of the gas passage defining plate 50 at a position closer to the lower side of the gas passage defining plate 50 than the middle of the gas passage defining plate 50 in the up-down direction.

Three coolant supply ports 14 are disposed on the lower side of the fuel gas supply port 12 and spaced apart from each other in the up-down direction. Coolant is supplied through the three coolant supply ports 14 toward the power generation portion 11. Three coolant discharge ports 15 are disposed on the upper side of the fuel gas discharge port 13 and spaced apart from each other in the up-down direction. Coolant is discharged through the three coolant discharge ports 15 from the power generation portion 11.

The frame member 60 further includes oxidant gas supply ports 16 through which oxidant gas is supplied as reactant gas and oxidant gas discharge ports 17 through which oxidant gas is discharged. The oxidant gas supply ports 16 and the oxidant gas discharge ports 17 are respectively located on the opposite ends of the gas passage defining plate 50 in the up-down direction. The oxidant gas in the present embodiment is, for example, air. In the present embodiment, six oxidant gas supply ports 16 are spaced apart from each other in the left-right direction. Likewise, six oxidant gas discharge ports 17 are spaced apart from each other in the left-right direction. A partition 18 is disposed between adjacent ones of the oxidant gas supply ports 16 to divide the oxidant gas supply ports 16 from each other.

The first separator 30 and the second separator 40 include through-holes (not shown) at positions corresponding to the supply ports 12, 14, 16 and the discharge ports 13, 15, 17.

The oxidant gas supplied from the oxidant gas supply ports 16 flows to the gas passage defining plate 50 and is then discharged out of the oxidant gas discharge ports 17.

The direction in which oxidant gas flows from the oxidant gas supply ports 16 toward the oxidant gas discharge ports 17 is hereinafter referred to as the flow direction X. The direction in which the power generation portion 11 opposes the gas passage portion 51 of the gas passage defining plate 50 is hereinafter referred to as the opposing direction Y. The direction that is orthogonal to the flow direction X and the opposing direction Y is hereinafter referred to as the orthogonal direction Z.

The components of the cell 10 will now be described in detail.

MEGA 20

As shown in FIG. 1, the MEGA 20 includes a membrane electrode assembly 21, an anode-side gas diffusion layer 24, and a cathode-side gas diffusion layer 25. The anode-side gas diffusion layer 24 and the cathode-side gas diffusion layer 25, which are formed using carbon fibers, hold the membrane electrode assembly 21. The membrane electrode assembly 21 includes an electrolyte membrane 22 and two catalytic electrode layers 23 that hold the electrolyte membrane 22. The electrolyte membrane 22 is made of a solid polymer material that has an excellent proton conductivity in a wet state. Each catalytic electrode layer 23 supports a catalyst, such as platinum, in order to expedite the electrochemical reaction of reactant gas in the fuel cell.

First Separator 30

Referring to FIG. 1, the first separator 30 is formed by pressing a metal (e.g., stainless steel) plate. The middle portion of the first separator 30 is in contact with the anode-side gas diffusion layer 24 of the MEGA 20. Although not shown in the drawings, the portion located outward from the middle portion of the first separator 30 is in contact with the frame member 60.

The middle portion of the first separator 30 defines fuel gas passages 31 that extend at least in the flow direction X and have the shape of a groove. The fuel gas passages 31 are connected to the fuel gas supply port 12 and the fuel gas discharge port 13.

The surface of the first separator 30 on the side opposite from the fuel gas passages 31 defines coolant passages 32 that have the shape of a groove. The coolant passages 32 are each located between adjacent ones of the fuel gas passages 31 and connected to the coolant supply ports 14 and the coolant discharge ports 15.

Second Separator 40

Referring to FIG. 1, the second separator 40 of each cell 10 is formed by pressing a metal (e.g., stainless steel) plate. The second separator 40 includes a first surface and a second surface in the opposing direction Y. The first surface is in contact with the gas passage defining plate 50. The second surface is in contact with the first separator 30 of the adjacent cell 10.

Gas Passage Defining Plate 50

Figure 3:
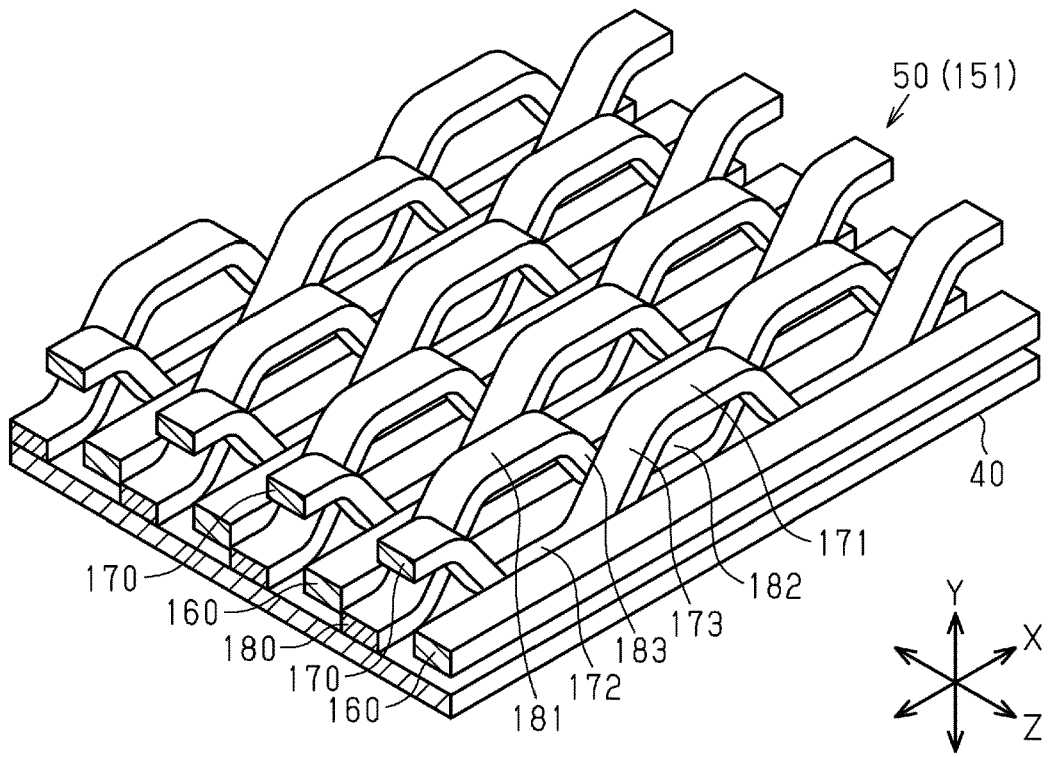
FIG. 3 is a cross-sectional perspective view showing part of the gas passage defining plate and the second separator in a first passage portion according to the embodiment.

Referring to FIG. 3, the gas passage defining plate 50 is formed by rolling a metal (e.g., stainless steel) plate.

Figure 4:
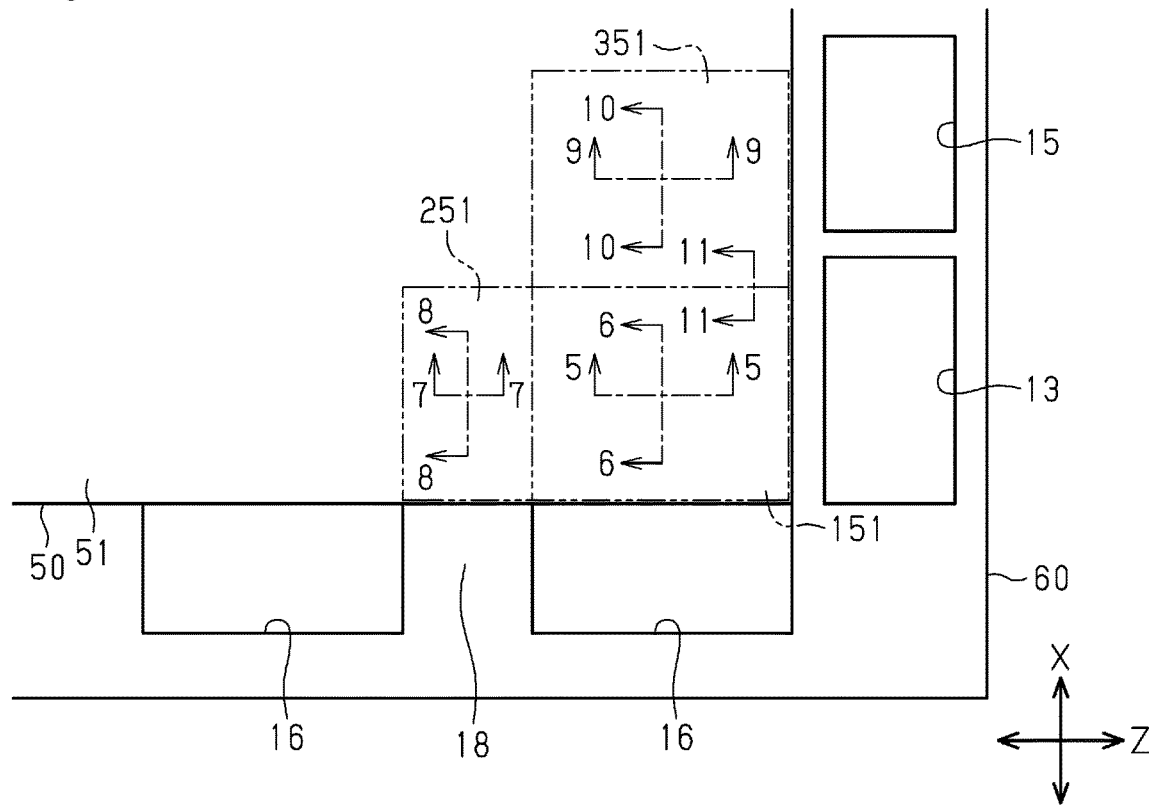
FIG. 4 is a plan view showing the positional relationship between the first passage portion, a second passage portion, and a third passage portion according to the embodiment.

As shown in FIG. 4, the gas passage portion 51 includes regions that differ from each other in shape. More specifically, the gas passage portion 51 includes a first passage portion 151 adjacent to the oxidant gas supply ports 16 in the flow direction X, a second passage portion 251 adjacent to the first passage portion 151 in the orthogonal direction Z, and a third passage portion 351 adjacent to the first passage portion 151 on the downstream side in the flow direction X. Further, the gas passage portion 51 has different shapes in the first to third passage portions 151 to 351.

The length of the first passage portion 151 in the orthogonal direction Z is substantially equal to the length of each oxidant gas supply port 16 in the orthogonal direction Z. The length of the second passage portion 251 in the orthogonal direction Z is substantially equal to the length of each partition 18 in the orthogonal direction Z. The length of the third passage portion 351 in the orthogonal direction Z is substantially equal to the length of the first passage portion 151 in the orthogonal direction Z. The length of the first passage portion 151 in the flow direction X is substantially equal to the length of the second passage portion 251 in the flow direction X.

The shapes of the first passage portion 151, the second passage portion 251, and the third passage portion 351 will now be described.

First Passage Portion 151

Figure 5:
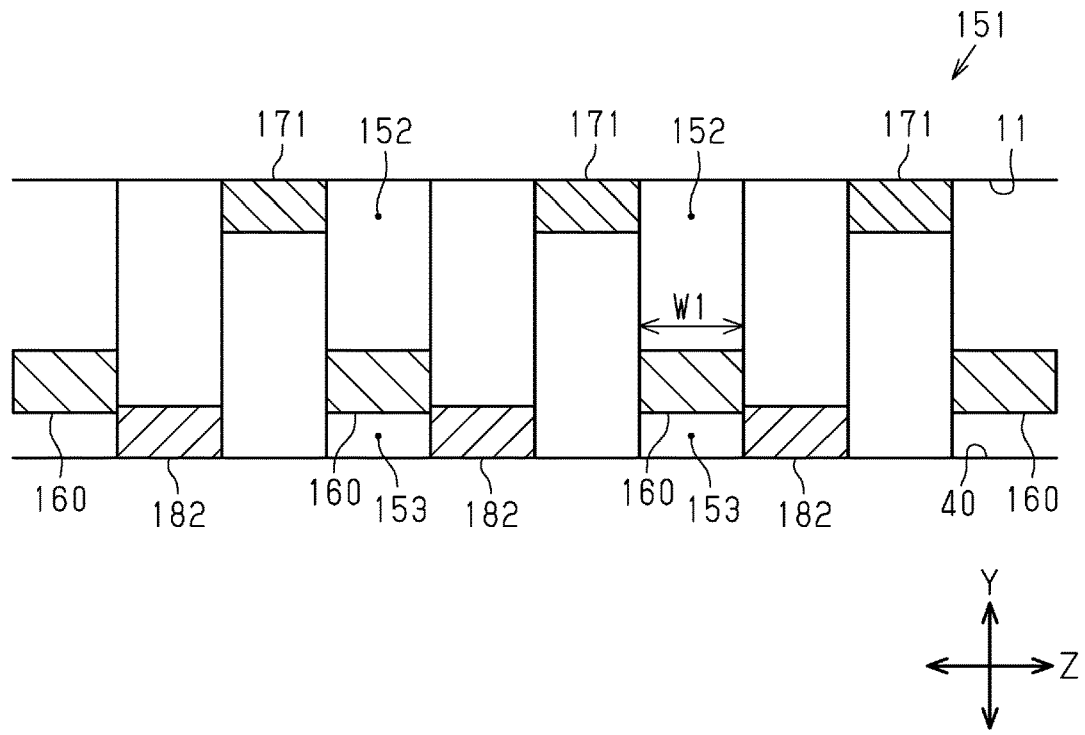
FIG. 5 is a cross-sectional view taken along line 5-5 in FIG. 4.
Figure 6:
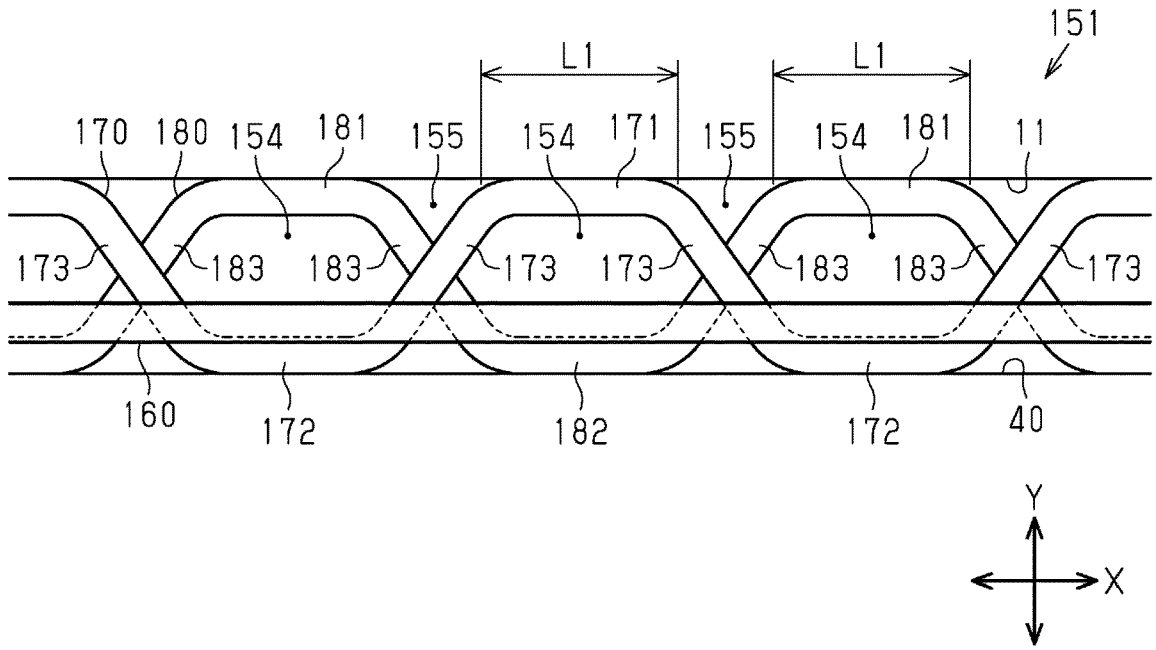
FIG. 6 is a cross-sectional view taken along line 6-6 of FIG. 4.

As shown in FIGS. 3, 5, and 6, the first passage portion 151 includes opposing portions 160 that oppose the power generation portion 11. The opposing portions 160 extend in the flow direction X and are arranged in parallel in the orthogonal direction Z. Each opposing portion 160 has the shape of a substantially quadrilateral bar. FIG. 3 is a perspective view showing the first passage portion 151 having the basic shape of the gas passage portion 51.

Wavy portions 170, 180 are integrally disposed on the opposite sides of each opposing portion 160 in the orthogonal direction Z. The wavy portions 170, 180 each have a wavy cross-sectional shape that is orthogonal to the orthogonal direction Z.

The wavy portions 170, 180 have the same shape. Thus, only the structure of the wavy portion 170 will be hereinafter described. The components of the wavy portion 180 are given reference number 18*, which is obtained by adding 10 to reference number 17* of the wavy portion 170, and redundant description will not be made. The wavy portion 170 corresponds to a first wavy portion. The wavy portion 180 corresponds to a second wavy portion.

Each wavy portion 170 includes first projections 171 and second projections 172. Each first projection 171 protrudes closer to the power generation portion 11 than the opposing portion 160 and is in contact with the power generation portion 11 (more specifically, in contact with the cathode-side gas diffusion layer 25). Each second projection 172 protrudes closer to the second separator 40 than the opposing portion 160 and is in contact with the second separator 40. Each of the first projections 171 and the second projections 172 includes a flat top extending in the flow direction X. The first projections 171 and the second projections 172 are alternately arranged in the flow direction X. Each first projection 171 includes two inclined portions 173 on the opposite sides of the first projection 171 in the flow direction X. Each inclined portion 173 is inclined with respect to the opposing direction Y and coupled to the corresponding second projection 172.

The wavy portions 170 and the wavy portions 180 are disposed adjacent to each other in the orthogonal direction Z such that the first projections 171 are adjacent to second projections 182 in the orthogonal direction Z and the second projections 172 are adjacent to first projections 181 in the orthogonal direction Z.

As shown in FIG. 5, a main passage 152 is defined between each opposing portion 160 and the power generation portion 11. The oxidant gas supplied from the oxidant gas supply ports 16 flows through the main passages 152. The main passages 152 are defined in correspondence with the opposing portions 160 and thus arranged in parallel in the orthogonal direction Z.

The cross-sectional flow area of each main passage 152 hereinafter refers to the cross-sectional flow area of each main passage 152 on a plane that is orthogonal to the flow direction X.

A water passage 153 is defined between each opposing portion 160 and the second separator 40. Generated water that is generated through the electrochemical reaction in the power generation portion 11 flows through the water passages 153.

As shown in FIG. 6, the first passage portion 151 includes connection passages 154 that each connect the main passages 152 to each other. The connection passages 154 are spaced apart from each other in the flow direction X. The connection passages 154 are defined by the first projections 171, 181 of the wavy portions 170, 180 and by the opposing portions 160 on a plane that is orthogonal to the orthogonal direction Z.

A sub-passage 155 is defined between two of the connection passages 154 adjacent to each other in the flow direction X. Each sub-passage 155 connects these two connection passages 154 to each other. The sub-passages 155 are defined by the first projections 171 and the first projections 181 (more specifically, by inclined portions 173 and inclined portions 183) of the wavy portion 170 and the wavy portion 180 adjacent to each other and by the power generation portion 11 on the plane that is orthogonal to the orthogonal direction Z.

The cross-sectional flow area of each connection passage 154 hereinafter refers to the cross-sectional flow area of each connection passage 154 on the plane that is orthogonal to the orthogonal direction Z. The cross-sectional flow area of each sub-passage 155 hereinafter refers to the cross-sectional flow area of each sub-passage 155 on the plane that is orthogonal to the orthogonal direction Z.

Each wavy portion 170 and the corresponding wavy portion 180 are disposed such that the connection passages 154 each have a larger cross-sectional flow area than the sub-passages 155. Thus, the oxidant gas flowing through the connection passages 154 causes a smaller pressure drop than the oxidant gas flowing through the sub-passages 155. Accordingly, most of the oxidant gas flowing through each main passage 152 flows to the adjacent main passage 152 through the corresponding connection passage 154.

Second Passage Portion 251

The shape of the second passage portion 251 is similar to that of the first passage portion 151. The components of the second passage portion 251 are hereinafter given reference number 2, which is obtained by adding 100 to reference number 1, and redundant description may be omitted.

Figure 7:
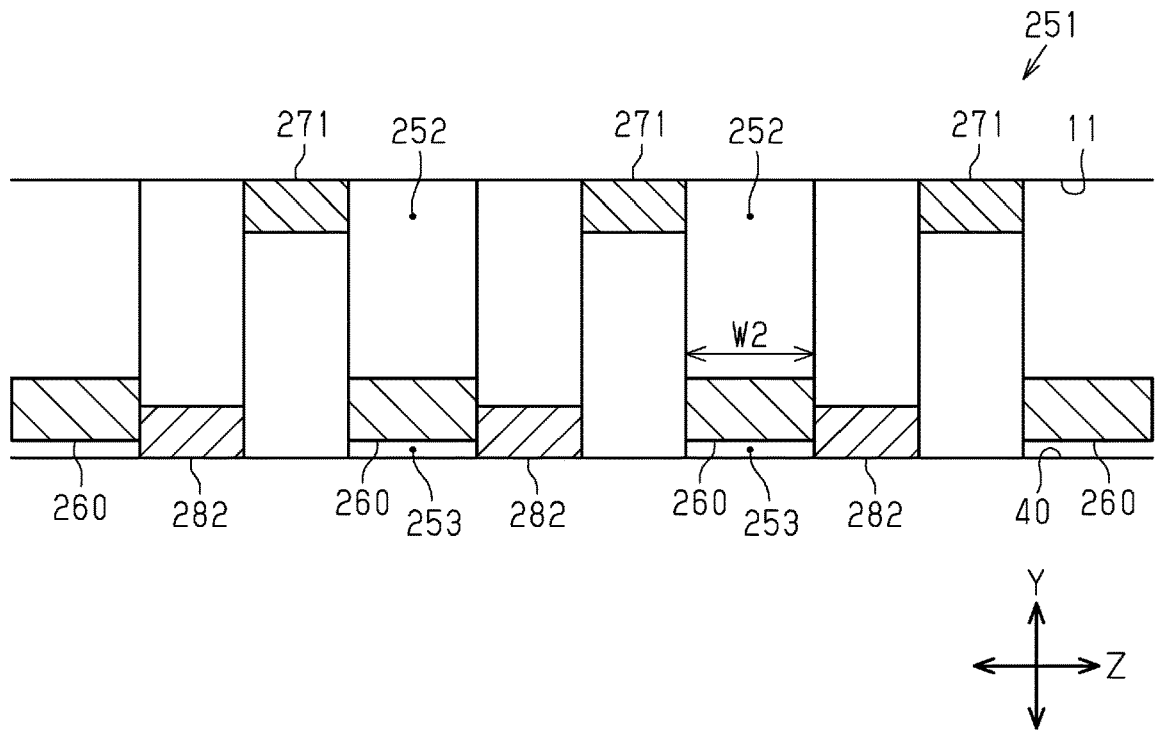
FIG. 7 is a cross-sectional view taken along line 7-7 of FIG. 4.

As shown in FIGS. 5 and 7, width W2 of each opposing portion 260 of the second passage portion 251 in the orthogonal direction Z is larger than width W1 of the corresponding opposing portion 160 of the first passage portion 151 in the orthogonal direction Z. The opposing portions 260 are farther from the power generation portion 11 in the opposing direction Y than the opposing portions 160. Thus, main passages 252 of the second passage portion 251 each have a larger cross-sectional flow area than the main passages 152 of the first passage portion 151.

Figure 8:
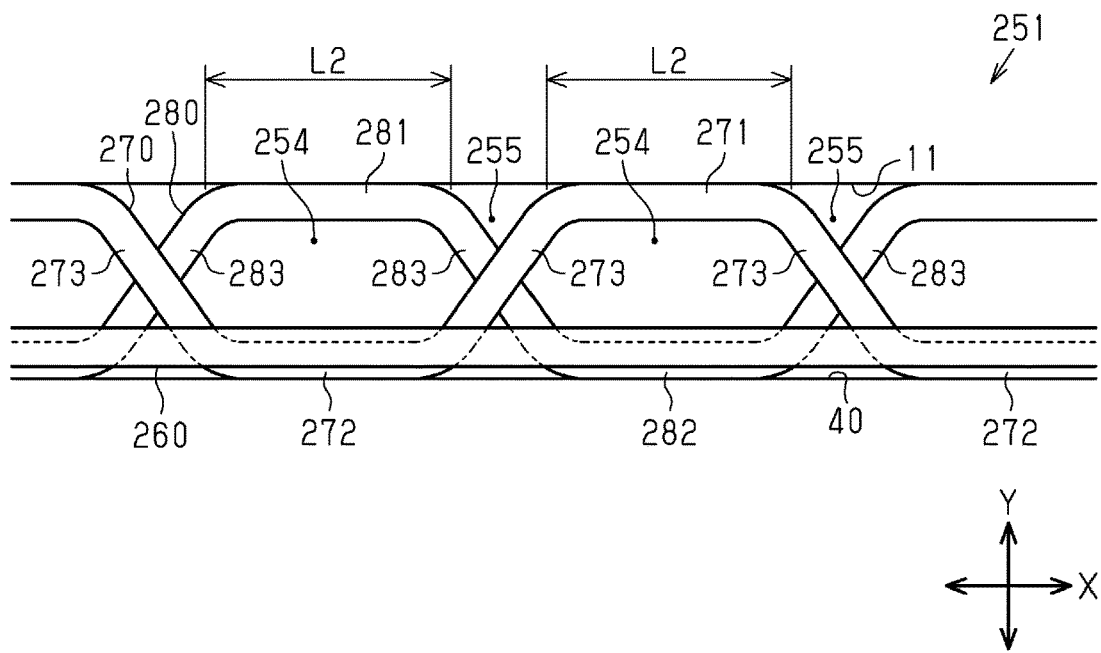
FIG. 8 is a cross-sectional view taken along line 8-8 of FIG. 4.

As shown in FIGS. 6 and 8, length L2 of the tops of first projections 271 and first projections 281 of the second passage portion 251 in the flow direction X is longer than length L1 of the tops of first projections 171 and first projections 181 of the first passage portion 151 in the flow direction X. Thus, connection passages 254 of the second passage portion 251 each have a larger cross-sectional flow area than the connection passages 154 of the first passage portion 151.

Inclined portions 273, 283 of the second passage portion 251 have the same shape as the inclined portions 173, 183 of the first passage portion 151. Thus, sub-passages 255 of the second passage portion 251 each have the same cross-sectional flow area as the sub-passages 155 of the first passage portion 151.

Third Passage Portion 351

The shape of the third passage portion 351 is similar to that of the first passage portion 151. The components of the second passage portion 251 are hereinafter given reference number 3, which is obtained by adding 200 to reference number 1, and redundant description may be omitted.

Figure 9:
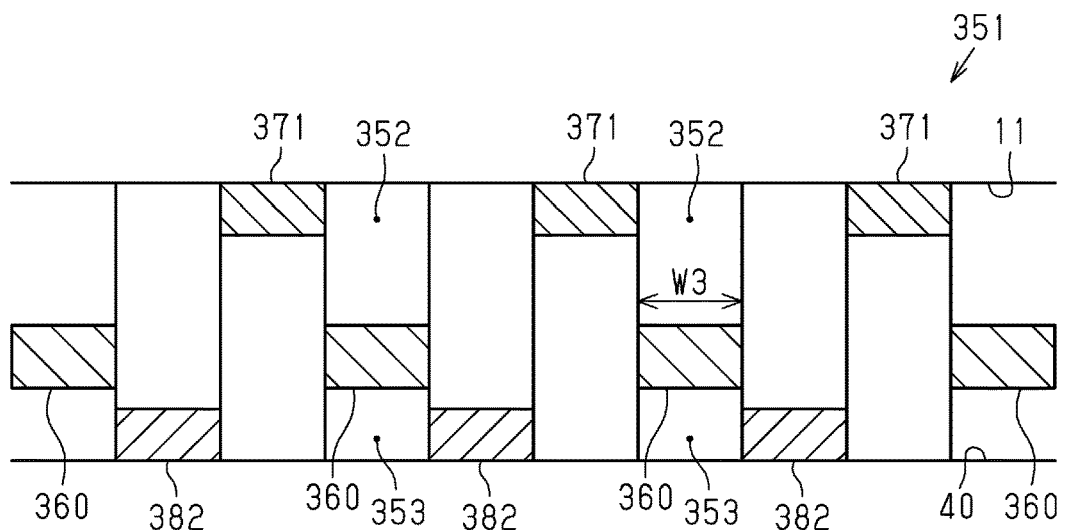
FIG. 9 is a cross-sectional view taken along line 9-9 of FIG. 4.

As shown in FIGS. 5 and 9, width W3 of each opposing portion 360 of the third passage portion 351 in the orthogonal direction Z is equal to width W1 of the corresponding opposing portion 160 of the first passage portion 151 in the orthogonal direction Z. The opposing portions 360 are closer to the power generation portion 11 in the opposing direction Y than the opposing portions 160. Thus, main passages 352 of the third passage portion 351 each have a smaller cross-sectional flow area than the main passages 152 of the first passage portion 151.

Figure 10:
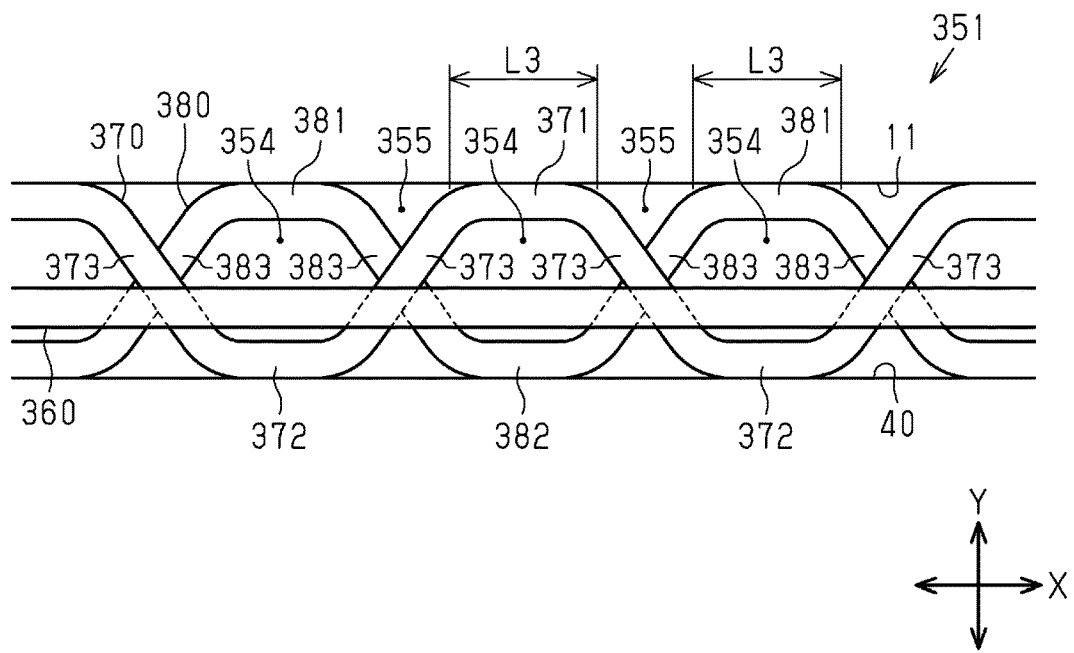
FIG. 10 is a cross-sectional view taken along line 10-10 in FIG. 4.

As shown in FIGS. 6 and 10, length L3 of the tops of first projections 371 and first projections 381 of the third passage portion 351 in the flow direction X is shorter than length L1 of the tops of first projections 171 and first projections 181 of the first passage portion 151 in the flow direction X. Thus, connection passages 354 of the third passage portion 351 each have a smaller cross-sectional flow area than the connection passages 154 of the first passage portion 151.

Inclined portions 373, 383 of the third passage portion 351 have the same shape as the inclined portions 173, 183 of the first passage portion 151. Thus, sub-passages 355 of the third passage portion 351 each have the same cross-sectional flow area as the sub-passages 155 of the first passage portion 151.

Figure 11:
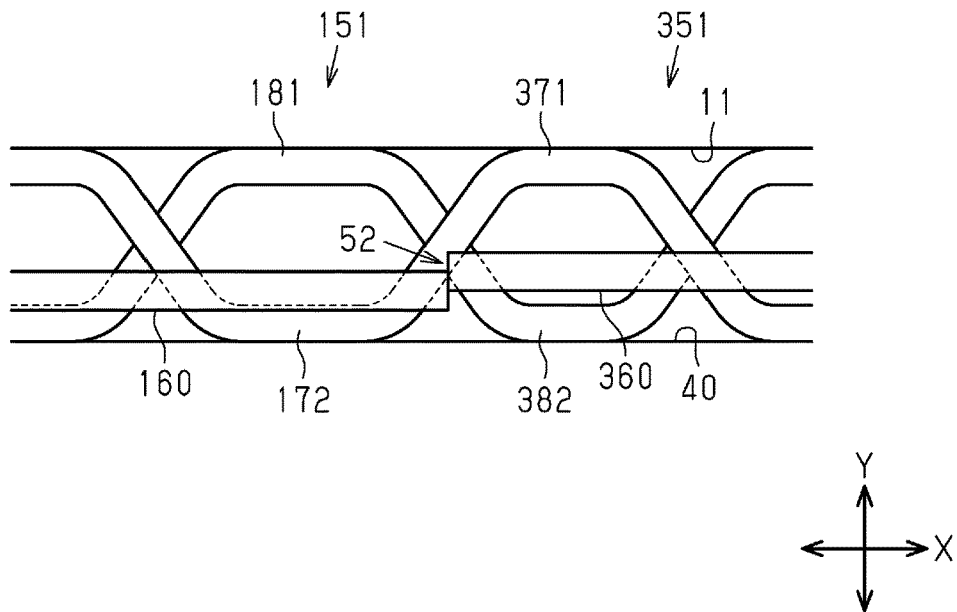
FIG. 11 is a cross-sectional view taken along line 11-11 in FIG. 4.
Figure 12:
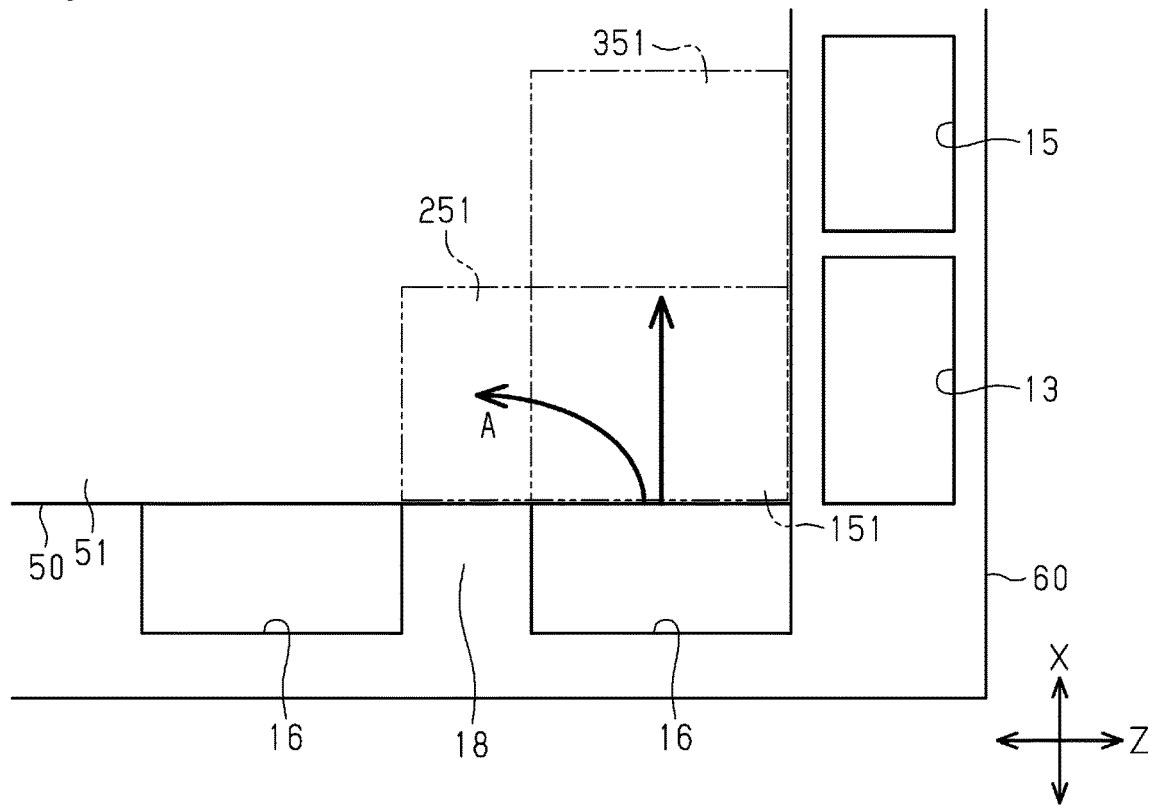
FIG. 12 is a plan view of the gas passage defining plate, showing the flow of oxidant gas according to the embodiment.

As shown in FIG. 11, the opposing portion 160 and the opposing portion 360 that extend in the flow direction X have a different distance from the power generation portion 11. This creates a step 52 at the boundary between the opposing portions 160 and 360.

The operation of the present embodiment will now be described.

The connection passages 254 of the second passage portion 251 each have a larger cross-sectional flow area than the connection passages 154 of the first passage portion 151. Thus, the oxidant gas in the connection passages 254 of the second passage portion 251 causes a smaller pressure drop than the oxidant gas in the connection passages 154 of the first passage portion 151. Accordingly, as shown by arrow A in FIG. 12, the oxidant gas that has flowed from each of the oxidant gas supply ports 16 to the first passage portion 151 easily flows to the second passage portion 251 through the connection passages 254 of the second passage portion 251 (operation 1).

The connection passages 354 of the third passage portion 351 each have a smaller cross-sectional flow area than the connection passages 154 of the first passage portion 151. Thus, the oxidant gas in the connection passages 354 of the third passage portion 351 causes a larger pressure drop than the oxidant gas in the connection passages 154 of the first passage portion 151. Accordingly, as shown by arrow A in FIG. 12, the oxidant gas that has flowed from each of the oxidant gas supply ports 16 to the first passage portion 151 flows to the second passage portion 251 through the connection passages 254 of the second passage portion 251 more easily than through the connection passages 354 of the third passage portion 351 (operation 2).

Further, the main passages 252 of the second passage portion 251 each have a larger cross-sectional flow area than the main passages 152 of the first passage portion 151. Thus, the oxidant gas in the main passages 252 of the second passage portion 251 causes a smaller pressure drop than the oxidant gas in the main passages 152 of the first passage portion 151. Accordingly, as shown by arrow A in FIG. 12, the oxidant gas that has flowed from the oxidant gas supply port 16 to the main passages 152 of the first passage portion 151 easily flows to the main passages 252 of the second passage portion 251 through the connection passages 154 (operation 3).

Further, the main passages 352 of the third passage portion 351 each have a smaller cross-sectional flow area than the main passages 152 of the first passage portion 151. Thus, the oxidant gas in the main passages 352 of the third passage portion 351 causes a larger pressure drop than the oxidant gas in the main passages 152 of the first passage portion 151. Accordingly, as shown by arrow A in FIG. 12, the oxidant gas flowing from the oxidant gas supply port 16 to the main passages 152 of the first passage portion 151 flows to the second passage portion 251, which have a relatively small pressure drop, more easily than through the third passage portion 351, which have a relatively large pressure drop (operation 4).

The advantages of the embodiment will now be described.

(1) The gas passage portion 51 includes the opposing portions 160, 260. The opposing portions 160, 260 extend in the flow direction X and are arranged in parallel in the orthogonal direction Z. The main passages 152, 252 are defined between the opposing portions 160, 260 and the power generation portion 11. The gas passage portion 51 includes the connection passages 154, 254 that each connect the main passages 152, 252 to each other and are spaced apart from each other in the flow direction X. The connection passages 254 of the second passage portion 251 each have a larger cross-sectional flow area than the connection passages 154 of the first passage portion 151.

Such a structure produces the above-described operation 1. Thus, the oxidant gas that has flowed from the oxidant gas supply ports 16 easily flows from the first passage portion 151 toward the second passage portion 251. This allows the oxidant gas to be distributed over a wider range of the gas passage portion 51. Accordingly, the performance of distributing oxidant gas improves.

(2) The connection passages 354 of the third passage portion 351 each have a smaller cross-sectional flow area than the connection passages 154 of the first passage portion 151.

Such a structure produces the above-described operation 2 and thus further improves the performance of distributing oxidant gas.

(3) The main passages 252 of the second passage portion 251 each have a larger cross-sectional flow area than the main passages 152 of the first passage portion 151.

Such a structure produces the above-described operation 3 and thus further improves the performance of distributing oxidant gas.

(4) The opposing portions 260 of the second passage portion 251 are farther from the power generation portion 11 in the opposing direction Y than the opposing portions 160 of the first passage portion 151.

In such a structure, the opposing portions 260 defining the main passages 252 of the second passage portion 251 are farther from the power generation portion 11 in the opposing direction Y than the opposing portions 160 defining the main passages 152 of the first passage portion 151. Thus, the main passages 252 of the second passage portion 251 each have a larger cross-sectional flow area than the main passages 152 of the first passage portion 151.

In this structure, a simple change is made so as to change the distances of the opposing portions 260 from the power generation portion 11. As a result, the main passages 252 of the second passage portion 251 each have a larger cross-sectional flow area than the main passages 152 of the first passage portion 151.

(5) Width W2 of each opposing portion 260 of the second passage portion 251 in the orthogonal direction Z is larger than width W1 of the corresponding opposing portion 160 of the first passage portion 151 in the orthogonal direction Z.

In such a structure, width W2 of each of the opposing portions 260 defining the main passages 252 of the second passage portion 251 is larger than width W1 of the corresponding one of the opposing portions 160 defining the main passages 152 of the first passage portion 151. Thus, the main passages 252 of the second passage portion 251 each have a larger cross-sectional flow area than the main passages 152 of the first passage portion 151.

In this structure, a simple change is made so as to change width W2 of each opposing portion 260 in the orthogonal direction Z. As a result, the main passages 252 of the second passage portion 251 each have a larger cross-sectional flow area than the main passages 152 of the first passage portion 151.

(6) The main passages 352 of the third passage portion 351 each have a smaller cross-sectional flow area than the main passages 152 of the first passage portion 151.

Such a structure produces the above-described operation 4 and thus further improves the performance of distributing oxidant gas.

(7) The opposing portions 360 of the third passage portion 351 are closer to the power generation portion 11 in the opposing direction Y than the opposing portions 160 of the first passage portion 151.

In such a structure, the opposing portions 360 defining the main passages 352 of the third passage portion 351 are closer to the power generation portion 11 in the opposing direction Y than the opposing portions 160 defining the main passages 152 of the first passage portion 151. Thus, the main passages 352 of the third passage portion 351 each have a smaller cross-sectional flow area than the main passages 152 of the first passage portion 151.

In this structure, a simple change is made so as to change the distances of the opposing portions 360 from the power generation portion 11. As a result, the main passages 352 of the third passage portion 351 each have a smaller cross-sectional flow area than the main passages 152 of the first passage portion 151.

(8) The opposing portions 160 of the first passage portion 151 are respectively made continuous with the opposing portions 360 of the third passage portion 351 by the steps 52.

Such a structure causes the reactant gas flowing in the flow direction X to collide with the steps 52. Thus, the pressure drop of oxidant gas easily increases at the boundary between the first passage portion 151 and the third passage portion 351. This increases the difference in pressure drop of oxidant gas between the first passage portion 151 and the third passage portion 351.

Modifications

The present embodiment may be modified as follows. The present embodiment and the following modifications can be combined as long as they remain technically consistent with each other.

Figure 13:
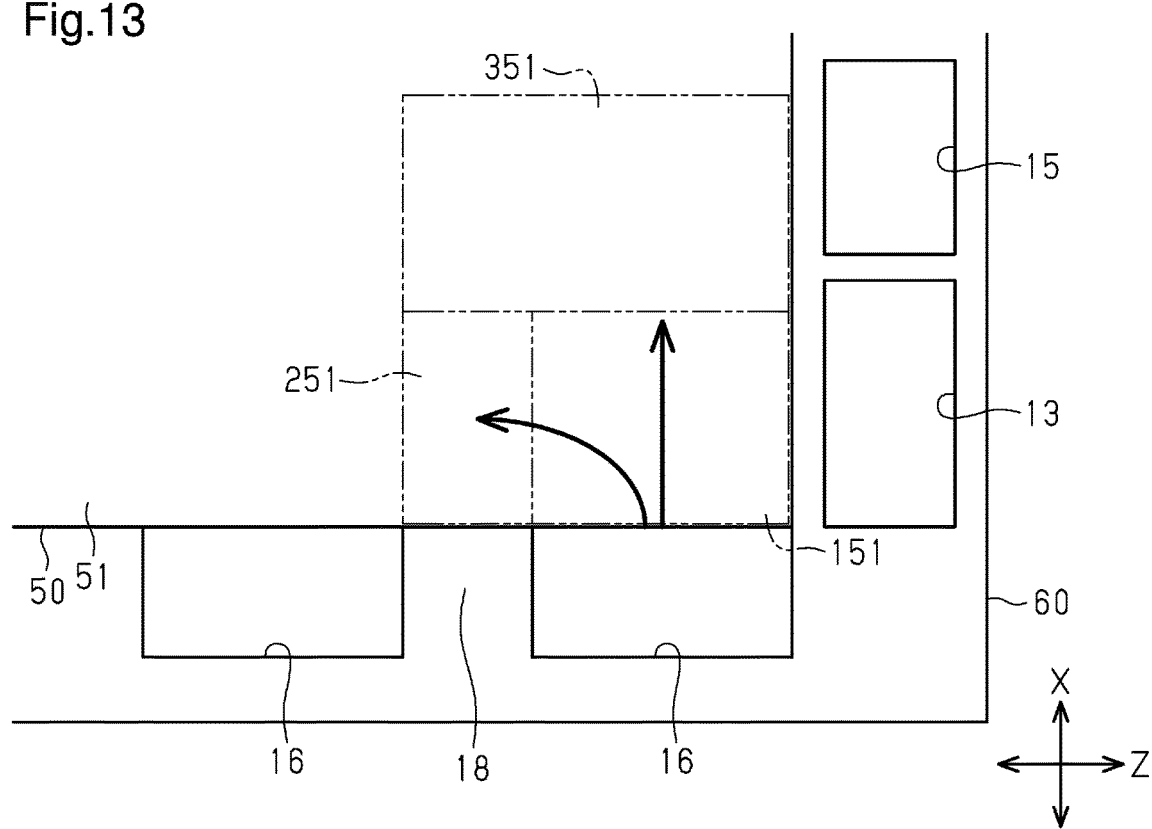
FIG. 13 is a plan view showing the positional relationship between the first passage portion, the second passage portion, and the third passage portion according to a first modification.

As shown in FIG. 13, the third passage portion 351 may be adjacent to the first passage portion 151 and the second passage portion 251 on the downstream side in the flow direction X. This limits the flow of oxidant gas from the second passage portion 251 toward the third passage portion 351 and thus allows the oxidant gas to easily flow in the orthogonal direction Z.

Figure 14:
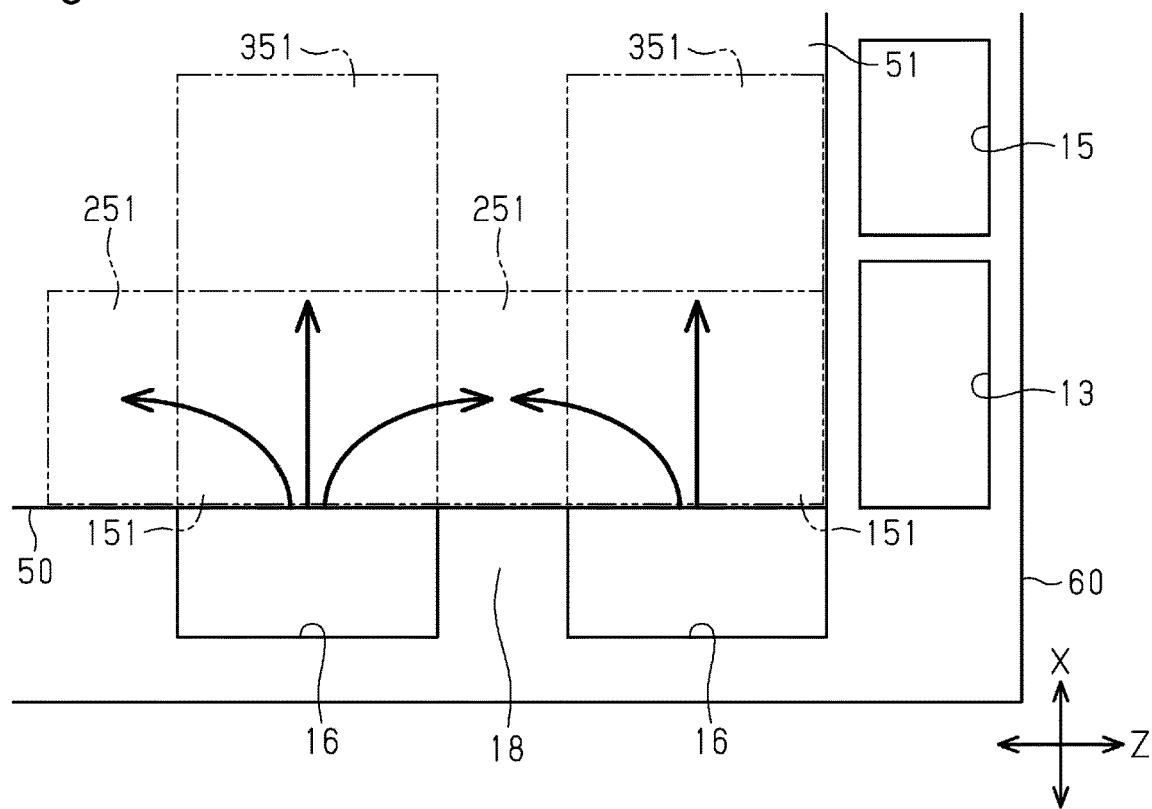
FIG. 14 is a plan view showing the positional relationship between the first passage portion, the second passage portion, and the third passage portion according to a second modification.

As shown in FIG. 14, the gas passage portion 51 may include second passage portions 251 that are adjacent to the opposite sides of each first passage portion 151 in the orthogonal direction Z.

Figure 15:
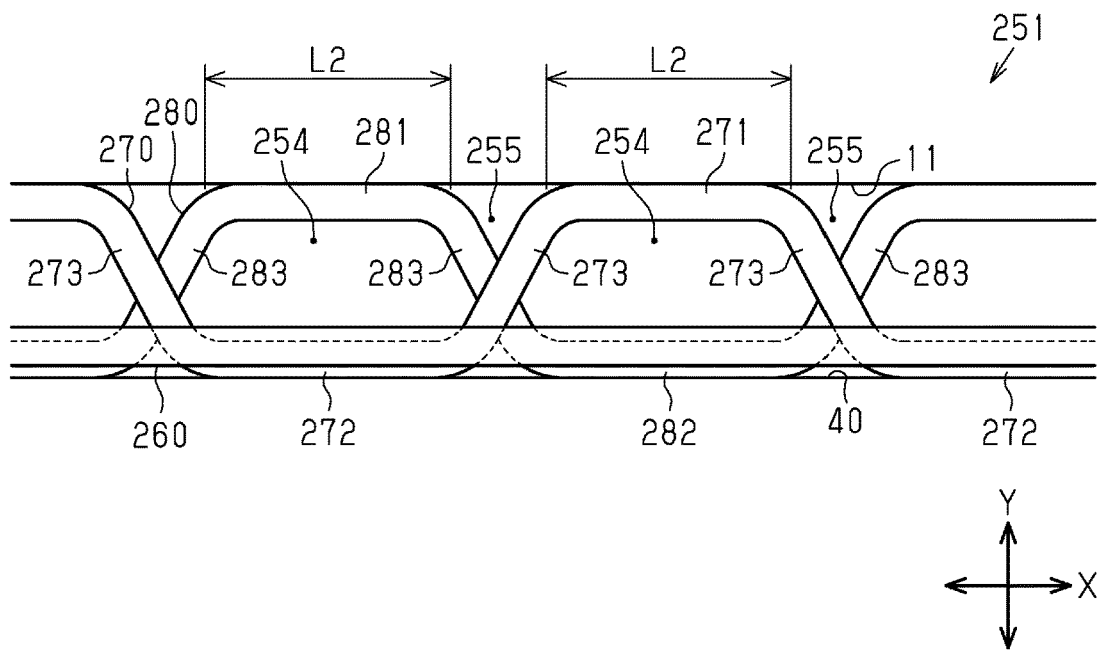
FIG. 15 is a cross-sectional view according to a third modification, corresponding to FIG. 8.

In the present embodiment, the sub-passages 155 of the first passage portion 151 each have the same cross-sectional flow area as the sub-passages 255 of the second passage portion 251. Instead, as shown in FIG. 15, the sub-passages 255 may each have a larger cross-sectional flow area than the sub-passages 155. In this case, the oxidant gas in the sub-passages 255 of the second passage portion 251 causes a smaller pressure drop than the oxidant gas in the sub-passages 155 of the first passage portion 151. Accordingly, the oxidant gas flowing from the oxidant gas supply ports 16 to the first passage portion 151 easily flows to the second passage portion 251 through the sub-passages 255 of the second passage portion 251. That is, the oxidant gas that has flowed from each of the oxidant gas supply ports 16 easily flows from the first passage portion 151 toward the second passage portion 251. This allows the oxidant gas to be distributed over a wider range of the gas passage portion 51. In this modification, the inclination angles of the inclined portions 273, 283 with respect to the opposing direction Y are set to be smaller than the inclination angles of the inclined portions 173, 183 with respect to the opposing direction Y so that the sub-passages 255 each have a larger cross-sectional flow area than the sub-passages 155.

Figure 16:
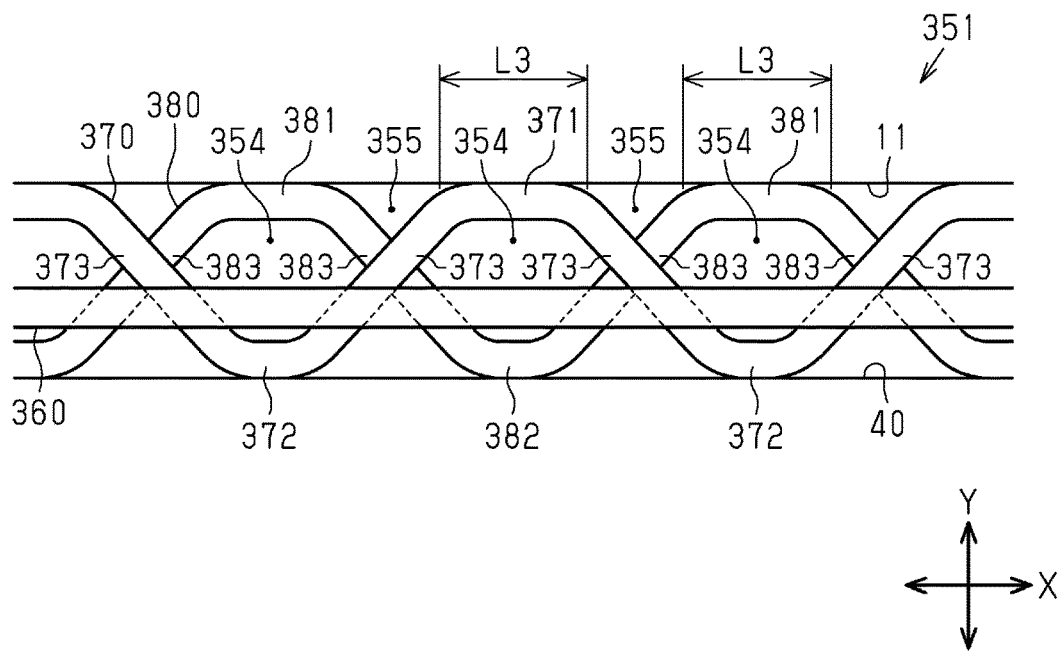
FIG. 16 is a cross-sectional view according to a fourth modification, corresponding to FIG. 10.

In the present embodiment, the sub-passages 155 of the first passage portion 151 each have the same cross-sectional flow area as the sub-passages 355 of the third passage portion 351. Instead, as shown in FIG. 16, the sub-passages 355 may each have a smaller cross-sectional flow area than the sub-passages 155. In this case, the oxidant gas in the sub-passages 355 of the third passage portion 351 causes a larger pressure drop than the oxidant gas in the sub-passages 155 of the first passage portion 151. Accordingly, the oxidant gas flowing from the oxidant gas supply ports 16 to the first passage portion 151 flows to the second passage portion 251 through the sub-passages 255 of the second passage portion 251 than through the sub-passages 355 of the third passage portion 351. That is, the oxidant gas that has flowed from the oxidant gas supply ports 16 easily flows from the first passage portion 151 toward the second passage portion 251. This allows the oxidant gas to be distributed over a wider range of the gas passage portion 51. In this modification, the inclination angles of the inclined portions 373, 383 with respect to the opposing direction Y are set to be larger than the inclination angles of the inclined portions 173, 183 with respect to the opposing direction Y so that the sub-passages 355 each have a smaller cross-sectional flow area than the sub-passages 155.

The opposing portions 160, 260, 360 may be inclined so as to approach the power generation portion 11 in the opposing direction Y toward the downstream side in the flow direction X. In this case, the pressure drop of oxidant gas gradually increases toward the downstream side in the flow direction X.

The distance of each opposing portion 360 of the third passage portion 351 from the power generation portion 11 may be equal to the distance of the corresponding opposing portion 160 of the first passage portion 151 from the power generation portion 11. Even in this case, length L3 of the tops of the first projections 371, 381 of the third passage portion 351 is shorter than length L1 of the tops of the first projections 171, 181 of the first passage portion 151. Thus, the connection passages 354 of the third passage portion 351 each have a smaller cross-sectional flow area than the connection passages 154 of the first passage portion 151. This provides the above-described advantage (2).

As long as the opposing portions 260 of the second passage portion 251 are farther from the power generation portion 11 in the opposing direction Y than the opposing portions 160 of the first passage portion 151, width W2 of each opposing portion 260 may be equal to width W1 of the corresponding opposing portion 160.

As long as width W2 of each opposing portion 260 of the second passage portion 251 is larger than width W1 of the corresponding opposing portion 160 of the first passage portion 151, the distance of the opposing portions 260 from the power generation portion 11 may be equal to the distance of the opposing portions 160 from the power generation portion 11.

The following structure may be employed. That is, the distance of each opposing portion 260 of the second passage portion 251 from the power generation portion 11 is equal to the distance of the corresponding opposing portion 160 of the first passage portion 151 from the power generation portion 11, and width W2 of each opposing portion 260 is equal to width W1 of the corresponding opposing portion 160. Even in this case, length L2 of the tops of the first projections 271, 281 of the second passage portion 251 is longer than length L1 of the tops of the first projections 171, 181 of the first passage portion 151. Thus, the connection passages 254 of the second passage portion 251 each have a larger cross-sectional flow area than the connection passages 154 of the first passage portion 151. This provides the above-described advantage (1).

Length L1 of the tops of the first projections 171, 181 of the first passage portion 151 may be equal to length L3 of the tops of the first projections 371, 381 of the third passage portion 351. Even in this case, the opposing portions 360 of the third passage portion 351 are closer to the power generation portion 11 in the opposing direction Y than the opposing portions 160 of the first passage portion 151. Thus, the main passages 352 of the third passage portion 351 each have a smaller cross-sectional flow area than the main passages 152 of the first passage portion 151. This provides the above-described advantage (6).

The following structure may be employed. That is, the distance of each opposing portion 360 of the third passage portion 351 from the power generation portion 11 is equal to the distance of the corresponding opposing portion 160 of the first passage portion 151 from the power generation portion 11, and length L3 of the tops of the first projections 371, 381 of the third passage portion 351 is equal to length L1 of the tops of the first projections 171, 181 of the first passage portion 151. Even in this case, the opposing portions 260 of the second passage portion 251 are farther from the power generation portion 11 in the opposing direction Y than the opposing portions 160 of the first passage portion 151, and width W2 of each opposing portion 260 is larger than width W1 of the corresponding opposing portion 160. Further, length L2 of the tops of the first projections 271, 281 of the second passage portion 251 is longer than length L1 of the tops of the first projections 171, 181 of the first passage portion 151. Thus, the main passages 252 of the second passage portion 251 each have a larger cross-sectional flow area than the main passages 152 of the first passage portion 151. This provides the above-described advantages (3) to (5).

The inclination angles of the inclined portions 173, 183, 273, 283, 373, 383 may be changed so as to change the cross-sectional flow areas of the connection passages 154, 254, 354.

In the present embodiment, the first passage portion 151 includes the wavy portion 170 and the wavy portion 180 that are disposed between two opposing portions 160 arranged in the orthogonal direction Z. Instead, only one wavy portion 170 or one wavy portion 180 may be disposed between two opposing portions 160. Alternatively, three or more wavy portions 170, 180 may be disposed between two opposing portions 160. The second passage portion 251 and the third passage portion 351 may be changed in the same manner.

In the present embodiment, the gas passage defining plate 50 is located on the cathode side, to which oxidant gas is supplied. Instead, the gas passage defining plate 50 may be located on the anode side, to which fuel gas is supplied.

In the gas passage portion 51, the portions other than the first passage portion 151, second passage portion 251, and third passage portion 351 may be changed in shape. For example, the portions may have the same shape as the first passage portion 151.

DESCRIPTION OF THE REFERENCE NUMERALS

10) Cell; 11) Power Generation Portion; 12) Fuel Gas Supply Port; 13) Fuel Gas Discharge Port; 14) Coolant Supply Port; 15) Coolant Discharge Port; 16) Oxidant Gas Supply Port; 17) Oxidant Gas Discharge Port; 18) Partition; 20) MEGA; 21) Membrane Electrode Assembly; 22) Electrolyte Film; 23) Catalytic Electrode Layer; 24) Anode-Side Gas Diffusion Layer; 25) Cathode-Side Gas Diffusion Layer; 30) First Separator; 31) Fuel Gas Passage; 32) Coolant Passage; 40) Second Separator; 50) Gas Passage Defining Plate; 51) Gas Passage Portion; 52) Step; 60) Frame Member; 151) First Passage Portion; 152, 252, 352) Main Passage; 153, 253, 353) Water Passage; 154, 254, 354) Connection Passage; 155, 255, 355) Sub-Passage; 160, 260, 360) Opposing Portion; 170, 270, 370) Wavy Portion; 171, 271, 371) First Projection; 172, 272, 372) Second Projection; 173, 273, 373) Inclined Portion; 180, 280, 380) Wavy Portion; 181, 281, 381) First Projection; 182, 282, 382) Second Projection; 183, 283, 383) Inclined Portion; 251) Second Passage Portion; 351) Third Passage Portion

What is claimed is:

1. A fuel cell stack, comprising stacked cells each including:
    a sheet-shaped power generation portion;
    two separators that hold the power generation portion in a thickness direction;
    a gas passage defining plate disposed between at least one of the two separators and the power generation portion, the gas passage defining plate including a gas passage portion through which reactant gas flows; and
    a frame member disposed around the gas passage defining plate, the frame member including a supply port through which the reactant gas is supplied to the gas passage portion and a discharge port through which the reactant gas is discharged from the gas passage portion, wherein a flow direction of the reactant gas flowing from the supply port toward the discharge port is referred to as a flow direction, a direction in which the power generation portion opposes the gas passage portion is referred to as an opposing direction, a direction that is orthogonal to the flow direction and the opposing direction is referred to as an orthogonal direction, the gas passage portion includes opposing portions and wavy portions, the opposing portions being extended in the flow direction and arranged in parallel in the orthogonal direction, the opposing portions opposing the power generation portion, the wavy portions being integrally disposed on opposite sides of each of the opposing portions in the orthogonal direction, and the wavy portions each having a wavy cross-sectional shape that is orthogonal to the orthogonal direction, each of the wavy portions includes first projections and second projections, the first projections protruding closer to the power generation portion than the opposing portions and being in contact with the power generation portion, the second projections protruding closer to a corresponding one of the separators than the opposing portions and being in contact with the separator, and the first projections and the second projections being alternately arranged in the flow direction, a main passage is defined between each of the opposing portions and the power generation portion, the gas passage portion includes connection passages defined by the first projections and the opposing portions, the connection passages each connecting the main passages to each other and being spaced apart from each other in the flow direction, the gas passage portion includes a first passage portion and a second passage portion, the first passage portion being adjacent to the supply port in the flow direction, and the second passage portion being adjacent to the first passage portion in the orthogonal direction, and the connection passages of the second passage portion each have a larger cross-sectional flow area than the connection passages of the first passage portion.

2. The fuel cell stack according to claim 1, wherein
the gas passage portion includes a third passage portion that is adjacent to the first passage portion on a downstream side in the flow direction, and
the connection passages of the third passage portion each have a smaller cross-sectional flow area than the connection passages of the first passage portion.

3. The fuel cell stack according to claim 1, wherein
the wavy portions include a first wavy portion and a second wavy portion that are adjacent to each other in the orthogonal direction,
the first wavy portion and the second wavy portion are disposed such that the first projections of the first wavy portion are adjacent to the second projections of the second wavy portion in the orthogonal direction and the second projections of the first wavy portion are adjacent to the first projections of the second wavy portion in the orthogonal direction,
the gas passage portion includes sub-passages spaced apart from each other in the flow direction, each of the sub-passages being located between adjacent ones of the connection passages in the flow direction, and the sub-passages being respectively defined by the first projections of the first wavy portion, the first projections of the second wavy portion, and the power generation portion so as to connect the connection passages to each other, and
the sub-passages of the second passage portion each have a larger cross-sectional flow area than the sub-passages of the first passage portion.

4. The fuel cell stack according to claim 1, wherein
the wavy portions include a first wavy portion and a second wavy portion that are adjacent to each other in the orthogonal direction,
the first wavy portion and the second wavy portion are disposed such that the first projections of the first wavy portion are adjacent to the second projections of the second wavy portion in the orthogonal direction and the second projections of the first wavy portion are adjacent to the first projections of the second wavy portion in the orthogonal direction,
the gas passage portion includes sub-passages spaced apart from each other in the flow direction, each of the sub-passages being located between adjacent ones of the connection passages in the flow direction, and the sub-passages being respectively defined by the first projections of the first wavy portion, the first projections of the second wavy portion, and the power generation portion so as to connect the connection passages to each other,
the gas passage portion includes a third passage portion that is adjacent to the first passage portion on a downstream side in the flow direction, and
the sub-passages of the third passage portion each have a smaller cross-sectional flow area than the sub-passages of the first passage portion.

5. The fuel cell stack according to claim 1, wherein the main passages of the second passage portion each have a larger cross-sectional flow area than the main passages of the first passage portion.

6. The fuel cell stack according to claim 5, wherein the opposing portions of the second passage portion are farther from the power generation portion in the opposing direction than the opposing portions of the first passage portion.

7. The fuel cell stack according to claim 5, wherein the opposing portions of the second passage portion each have a larger width in the orthogonal direction than the opposing portions of the first passage portion.

8. The fuel cell stack according to claim 1, wherein
the gas passage portion includes a third passage portion that is adjacent to the first passage portion on a downstream side in the flow direction, and
the main passages of the third passage portion each have a smaller cross-sectional flow area than the main passages of the first passage portion.

9. The fuel cell stack according to claim 8, wherein the opposing portions of the third passage portion are closer to the power generation portion in the opposing direction than the opposing portions of the first passage portion.

10. The fuel cell stack according to claim 9, wherein each of the opposing portions of the first passage portion is made continuous with a corresponding one of the opposing portions of the third passage portion by a step.

* * * * *